Figure 1:
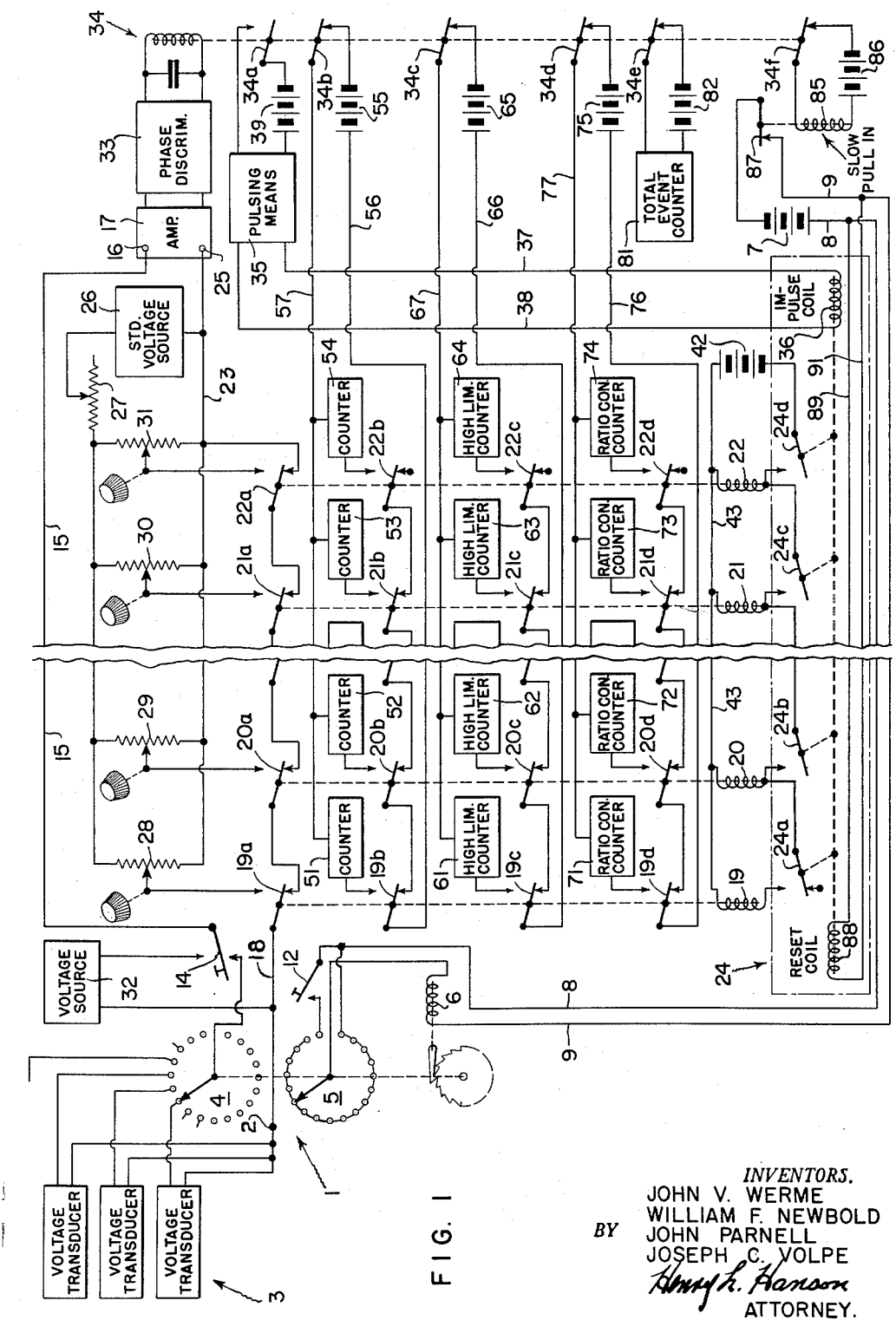

Jan. 16, 1962 J. V. WERME ET AL 3,017,097
CONTROL APPARATUS
Filed Nov. 30, 1955 2 Sheets-Sheet 1

INVENTORS.
JOHN V. WERME
WILLIAM F. NEWBOLD
JOHN PARNELL
JOSEPH C. VOLPE
BY
Henry L. Hanson
ATTORNEY.

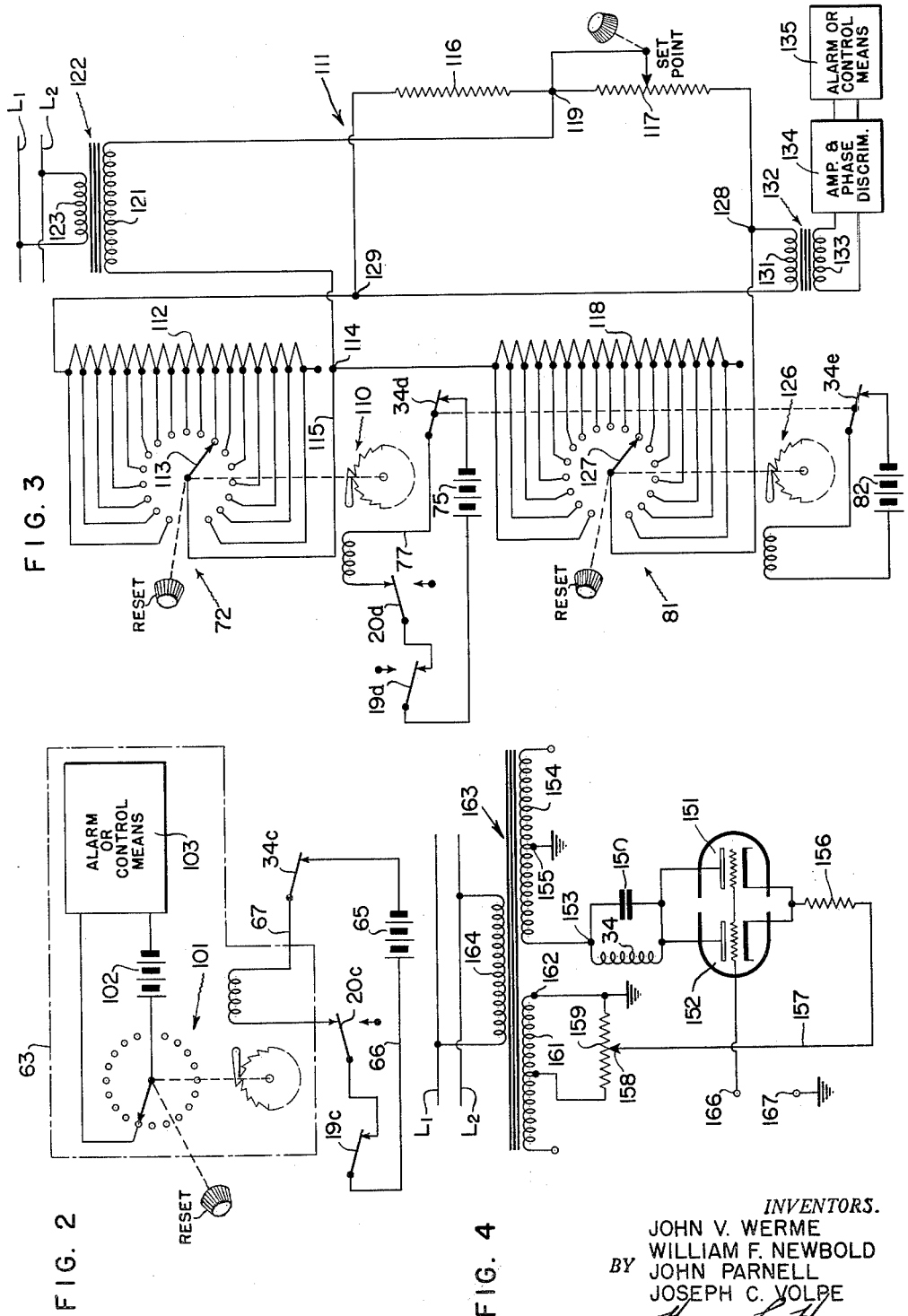

United States Patent Office 3,017,097
Patented Jan. 16, 1962

3,017,097
CONTROL APPARATUS
John V. Werme, Fort Washington, William F. Newbold, Ambler, John Parnell, Philadelphia, and Joseph C. Volpe, Levittown, Pa., assignors to Minneapolis-Honeywell Regulator Company, Minneapolis, Minn., a corporation of Delaware
Filed Nov. 30, 1955, Ser. No. 550,141
8 Claims. (Cl. 235—168)

A general object of the present invention is to provide a new and improved quality control apparatus. More specifically, the present invention is concerned with an apparatus adapted to classify a plurality of voltages according to their magnitudes and to perform an alarm or control function if the distribution of the voltages among the classification groups provided deviates from a predescribed norm.

Production testing of any manufactured article is desirable in order that the quality of the manufactured product be controlled. Such testing not only yields a highly reliable index of product quality but provides a basis for improving the uniformity of the product. In addition, product testing permits the detection of changes in the product due to trouble in the process before it has progressed to a serious stage, and thereby promotes general manufacturing efficiency. Product testing, however, is often tedious, time consuming, and costly. Accordingly, it is a further specific object of the present invention to provide a new and improved testing apparatus which automatically tests a plurality of variables.

In the testing of suitable samples of a batch of manufactured articles, a plot of the distribution of the deviation of the variable tested from the desired norm generally will produce the so-called bell shaped normal frequency distribution curve. From this curve it can be seen that small deviations from the norm occur frequently and large ones relatively infrequently. Assuming that a representative sample of sufficient size has been tested, this curve gives a good indication of the quality of the batch in which the sample was taken. It is therefore another specific object of the present invention to provide an apparatus which will give a numerical indication of the number of articles tested having values which fall into preselected deviation groups.

Still another object of the present invention is to provide a quantity control apparatus in which the number and range of the deviation groups provided can be easily varied to suit the application.

A further object of the present invention is to provide a quality control apparatus which is operative to perform a control or alarm function if an abnormal number of variables fall in any deviation group.

A still further object of the present invention is to provide a quality control apparatus which is operative to perform a control or alarm function if the ratio of the number of variables falling in any deviation group to the total number of variables scanned exceeds a predetermined value.

Another further object of the present invention is to provide a quality control apparatus which is operative to perform an alarm or control function if the ratio of the number of variables falling in any one channel to the number of variables falling in any other channel reaches a predetermined value.

The various objects of the present invention are achieved by an apparatus in which a voltage, proportional to the variable of interest, is classified according to its magntiude. This voltage is amplified and applied to a phase discriminator, causing the latter to energize a relay controlled thereby. The phase discriminator relay energizes a pulsing means which subsequently pulses an impulse counter. With each energizing pulse, the impulse counter adds to the input of an amplifier an amount of suppression equal to the value of a particular classification group. Suppression groups are applied to the input of the amplifier in steps, one after another, until the signal on the input of the amplifier reverses polarity. The reversal of the polarity of the signal applied to the input of the amplifier deenergizes the phase discriminator relay and causes the registration of the event by a counter associated with the particular suppression group causing the phase reversal. Ratio control means are also provided for each suppression group to provide for an alarm or control function from the ratio of the number of voltages falling within any two suppression groups. In addition, a total event counter is provided for use with the ratio control means. Automatic scanning means are also provided for effecting automatic scanning of a plurality of input voltages.

The various features of novelty which characterize this invention are pointed out with particularity in the claims annexed to and forming part of this specification. For a better understanding of the invention, its advantages, and the specific objects attained with its use, reference should be had to the accompanying drawings and descriptive matter in which there is illustrated and described a preferred embodiment of this invention.

Of the drawings:
FIG. 1 is a circuit diagram of a preferred embodiment of the present invention;
FIG. 2 is a schematic diagram of one of the high limit counters shown diagrammatically in the circuit of FIG. 1;
FIG. 3 is a schematic diagram of the ratio control means shown diagrammatically in the circuit of FIG. 1; and
FIG. 4 is a circuit diagram of the phase discriminator shown diagrammatically in the circuit of FIG. 1.

Referring now to FIG. 1, there is shown an embodiment of the present invention adapted for classifying a plurality of input voltages according to their magnitudes and for performing an alarm or a control function if the distribution of the voltages classified follows an undesirable pattern. The numeral 1 indicates a stepping switch for scanning the voltages to be classified. The contacts of the scanning switch 1 and a terminal 2 are the input terminals of the apparatus. As shown, the voltages to be classified are connected to these terminals. In the instant case, the voltages to be classified are supplied by a plurality of transducers 3 which are operable to produce in their output a voltage which is a function of the variable the quality of which is to be determined and controlled. The voltage transducers 3 may be any form of transducer operable to transform the variable of interest to a suitable voltage signal. By way of example, the transducers 3 might be strain gauge bridges, thermocouples, or the outputs of a mechanically positioned potentiometer circuit. If the variable of interest is voltage no transducers are necessary.

The stepping switch 1 has been shown as having two decks, 4 and 5. The contacts of deck 4 constitute one input terminal of the apparatus and the contacts of the deck 5 have been arranged to disconnect the stepping switch upon completion of the scanning operation. While the scanning switch 1 has been shown diagrammatically, in practice it will have more than one deck of contacts connected as input terminals in order that a large number of voltages may be scanned in succession. It also should be noted that the stepping switch 1 can be arranged to scan the input voltages continuously where that mode of operation is desirable. To affect the deenergization of the scanning switch 1 upon completion of this scanning operation, all but the last contact of the deck 5 have been connected through the scanning switch energizing coil 6 to a source of voltage, shown here as the battery 7, by means of the conductors 8 and 9. The last contact of the deck 5 is connected through the switch 12 and the conductor 8 to the battery 7. The switch 12 funcions as the circuit energizing switch.

The contacts of the deck 4 of the scanning switch 1 are connected by means of the contacts of a switch 14 and a conductor 15 to an input terminal 16 of an amplifier 17. The input terminal 2 is connected by means of a conductor 18, relay contacts 19a, 20a, 21a, and 22a and a conductor 23 to an input terminal 25 of the amplifier 17. The relay contacts 19a, 20a, 21a, and 22a are each operative to connect to the input of the amplifier 17, in series with the input voltage, a predetermined amount of the voltage suppression. As will be explained in more detail hereinafter, these contacts are sequentially operated by an impulse counter 24.

Each of the contacts 19a, 20a, 21a, and 22a constitutes part of the suppression group. The voltage difference between each suppression group represents a voltage range into which the value of the input voltage may fall. The number of groups may vary with the application. For example, there may be only two, one above and one below some net value; there may be three, a normal plus one high and one low; or there may be more, such as five; a center group, and two outside groups, one above and one below of slightly inferior characteristics but still acceptable, and last, two reject groups, one high and one low. Clearly, more groups are possible. The voltages for all of the suppression groups are derived from a standard voltage source 26, which may be a mercury cell or some other constant voltage battery, through an adjustable resistor 27. Each suppression group has an adjustable precision resistor connected in parallel across the resistor 27 and the voltage source 26. Thus, the contacts 19a are associated with an adjustable resistor 28, the contacts 20a are associated with an adjustable resistor 29, the contacts 21a are associated with an adjustable resistor 30 and the contacts 22a are associated with an adjustable resistor 31. As will be explained in greater detail hereinafter, a voltage source 32 is provided for calibrating the resistors 28, 29, 30, and 31 to provide the desired suppression voltage for each suppression group. As shown, the voltage source 32 can be connected to the input terminals of the amplifier 17 by means of the switch 14.

The output of the amplifier 17 is connected to a phase discriminator 33 which in turn is connected to a relay 34. The amplifier 17 is any D.C. conversion amplifier operative to convert a D.C. input signal into an alternating current signal and to amplify the resulting alternating current signal. For example, the amplifier 17 may be of the type shown in the W. P. Wills Patent 2,423,540, issued July 8, 1947. The phase discriminator 33 may be the motor drive stage of the amplifier shown in the aforementioned Wills patent modified in the manner shown in FIG. 4 to provide relay operation.

The relay 34, connected in the output of the phase discriminator 33, has associated therewith contacts 34a, 34b, 34c, 34d, 34e, and 34f. The contacts 34a are operative to connect a pulsing means 35 in series with a source of energizing voltage, shown here as the battery 39. The pulsing means 35 may be any suitable form of pulse generating means capable of producing pulses of sufficient magnitude and frequency for the operation of the impulse counter 24. By way of example, the pulsing means 35 may be an ordinary stepping relay. As shown, the output of the pulsing means 35 is connected to an impulse coil 36 of the impulse counter 24 by means of a pair of conductors 37 and 38. The impulse counter 24 is a Magnetic Impulse Counter manufactured by the Kellogg Switchboard and Supply Company. The impulse counter 24 has associated with it a plurality of contacts 24a, 24b, 24c, and 24d which are successively closed as the impulse coil 36 is pulsed by the pulse generating means 35. Each of the contacts 24a, 24b, 24c, and 24d is associated with a suppression group. Additional sets of contacts are available for suppression groups up to ten. When closed, the contacts 24a of the impulse counter 24 are operative to energize a relay 19 from a source of relay energizing voltage, shown here as the battery 42. This energizing circuit can be traced from the relay coil 19 through the conductor 43, the source 42, the contacts 24d, the contacts 24c, the contacts 24b, and the contacts 24a. In a similar manner, the contacts 24b are operative to energize a relay 20 from the source 42, the contacts 24c are operative to energize a relay 21 from the source 42, and the contacts 24d are operative to energize a relay 22 from the source 42.

Each of the relays 19, 20, 21, and 22 is associated with a suppression channel. The relay 19, in addition to the contacts 19a already described, has contacts 19b, 19c, and 19d. The relay 20, in addition to the contacts 20a already described, has contacts 20b, 20c, and 20d. The relay 21, in addition to the contacts 21a already described, in addition to the contacts 21a already described, has contacts 21b, 21c, and 21d. Similarly, the relay 22, in addition to the contacts 22a already described, has contacts 22b, 22c, and 22d.

The contacts 19b, 20b, 21b, and 22b are operative to connect counters 51, 52, 53, and 54, respectively, in series with a source of energizing voltage shown here as the battery 55. In addition to the relay contacts 19b, 20b, 21b, and 22b, the counter energizing circuit includes the conductor 56, the relay contacts 34b, and the conductor 57. The counters 51, 52, 53, and 54 are electrically operating indicating counters operative to provide a numerical indication of the number of input voltage signals occurring within each suppression group during a particular scanning operation.

The relay contacts 19c, 20c, 21c, and 22c, are operative to connect high limit counters 61, 62, 63, and 64, respectively, in series with a source of energizing voltage 65. In addition to the relay contacts 19c, 20c, 21c, and 22c, the high limit counter energizing circuit includes a conductor 66, relay contacts 34c, and a conductor 67. The high limit counters 61, 62, 63, and 64 are operative to provide an alarm or control function when, in the course of the scanning operation, more than a predetermined number of voltages are found to fall within any particular classification group. Specific details of the high limit counters 61, 62, 63, and 64 are shown in FIG. 2 and will be discussed in more detail hereinafter.

The relay contacts 19d, 20d, 21d, and 22d are operative to connect ratio control counters 71, 72, 73, and 74, respectively, in series with a source of energizing voltage 75. The ratio control counter energizing circuit includes, in addition to the relay contacts just mentioned, a conductor 76, relay contacts 34d, and a conductor 77. The ratio control counters 71, 72, 73, and 74 are operative to provide an alarm or control function from the ratio of the number of voltages appearing in any two channels or from the ratio of the voltage appearing in any one channel to the total number of voltages scanned. The construction of the ratio control counters 71, 72, 73, and 74 is shwn in FIG. 3, and their operation will be discussed in more detail hereinafter.

In order to provide an indication of the total number of events scanned and also control from the ratio of the total number of events scanned, a total events counter 81 is provided. The total events counter 81 is connected to a source of energizing current, shown here as the battery 82, by means of the relay contacts 34e. The construction and specific operation of the total events counter 81 is shown in FIG. 3 and will be discussed in more detail hereinafter.

In addition to the contacts already described, the relay 34 has contacts 34f which are operative to connect a slow pull in relay 85 to a source of energizing voltage, shown here as a battery 86. The slow pull in relay 85 has a pair of contacts 87 which are operative to connect coil 6 of the scanning relay 1 to the battery 7, and to connect the reset coil 88 of the impulse counter 24 to the battery 7 by means of a pair of conductors 89 and 91.

The operation of the apparatus of FIG. 1 is commenced by the closing of the switch 12 which connects the scanning switch 1 to the battery 7 through the closed relay contacts 87. The scanning switch 1 then steps to its first position connecting the first voltage to be scanned to the input of the amplifier 17. The input signal is amplified and applied to the phase discriminator 33 causing the latter to energize the relay 34 controlled thereby. The energization of the relay 34 closes the contacts 34a and opens the contacts 34b, 34c, 34d, 34e, and 34f. The closing of the contacts 34a causes the energization of the pulse generating means 35 which immediately starts pulsing the impulse counter 24. The first energization pulse applied to the impulse counter 24 closes the contacts 24d, energizing the relay 22. The energization of the relay 22 closes the contacts 22a, 22b, 22c, and 22d. The closing of the contact 22a causes a predetermined amount of voltage suppression to be applied in opposition to the input voltage to the input of the amplifier 17. If the amount of this suppression is insufficient to reverse the polarity of the signal applied to the amplifier 17, the relay 34 will continue to hold closed the contacts 34a and the pulse generating means will supply another pulse to the impulse counter 24. This impulse will cause the impulse counter 24 to close the contacts 24c. The contacts 24d remain closed and thus the relay 22 remains energized. It should be noted, that the contacts 24a, 24b, 24c, and 24d of the impulse counter 24, when once closed, remain closed until the energization of the reset coil 88.

The closing of the contacts 24c causes the energization of the relay 21 and the closing of the contacts 21a, 21b, 21c, and 21d associated therewith. It should be noted that although the relay 22 is still energized, the energization of relay 21 and the closing of contacts 21a, 21b, 21c, and 21d removes from the circuit the suppressions supplied by the closing of the contact 22a. The closing of the contacts 21a supplies suppression in the amount determined by the adjustment of the resistor 30 to the input of the amplifier 17. In normal operation the amount of this suppression will be larger than the amount applied by the closing of contacts 22a. If the amount of this suppression is still insufficient to cause a reversal in the polarity of the signal applied to the input of the amplifier 17, the relay 34 will remain energized and the pulse generating means 35 will continue pulsing the impulse counter 24. With each energizing pulse, the impulse counter applies to the input of the amplifier an amount of suppression equal to the value of the next suppression group. Thus, suppression equal to the value of each suppression group is applied to the input of the amplifier in steps, one after another, until the signal in the input of the amplifier reverses polarity. Upon the reversal of the polarity of the signal to the input of the amplifier, the relay 34 is deenergized opening contacts 34a and closing contacts 34b, 34c, 34d, 34e, and 34f. The opening of the contacts 34a deenergizes the pulse generating means 35. If the suppression group associated with the relay 20 had caused the reversal of the polarity of the signal applied to the input of the amplifier 17, the contacts 20a, 20b, 20c, and 20d would be in the circuit with their respective power supplies through the unoperated contacts associated with the relay 19.

With the deenergization of the relay 34, the contacts 34b, 34c, 34d, 34e, and 34f are closed, causing the energization of the circuits connected thereto. The closing of the contact 34b causes the energization of the counter 52 through a path which may be traced from the positive terminal of the battery 55, by way of the conductor 56, the relay contacts 19b, the relay contacts 20b, the counter 52, the conductor 57, and the relay contacts 34b to the negative terminal of the battery 55. Similarly, closing of the contact 34c will cause the energization of the high limit counter 62 and the closing of the relay contact 34d will cause the enregization of the ratio control counter 72. In addition, the closing of the contact 34e will cause the energization of the total event counter 81. The closing of the relay contact 34f causes the energization of the slow pull in relay 85 the operation of which is delayed sufficiently to permit the operation of the counters 52, 62, and 72. Upon the closing of the relay contacts 87, the reset coil 88 of the impulse counter 24 is reset, opening the contacts 24b, 24c, and 24d which remained closed upon the deenergization of the pulse generating means 35. Accordingly, the relays 20, 21, and 22 are deenergized. Simultaneously, the scanning switch 1 is energized causing this scanning switch to advance one step connecting a new voltage to the input of the amplifier 17. The process just described is repeated until all of the voltages connected to the scanning switch 1 have been classified according to their magnitudes. The counters 51, 52, 53, and 54 provides an indication of the number of voltages which fall within each particular suppression channel. These counters as well as the high limit counters and the ratio control counters can be manually reset before the start of new testing cycle. Such knobs are shown in FIGS. 2 and 3.

The voltage source 32 is provided to aid in the calibration of the suppression groups. To calibrate these groups, the source 32 is applied to the input of the amplifier 17 by means of the switch 14. The output of the source 32 is then adjusted to the value desired for the first suppression group. This voltage will cause the relay 34 to be energized and the system will start its classifying operation. The resistor 31 can then be adjusted until the relay 34 is deenergized and the counter 54 caused to register. The output of the voltage source 32 can then be increased to the voltage limit desired for the second suppression group and the resistor 30 adjusted until the relay 34 is deenergized and the counter 53 caused to register. This process can be repeated for each suppression group until they all have been calibrated. The counters may then be reset and a testing cycle begun.

Referring now to FIG. 2, there is shown a simplified circuit diagram of the high limit counter 62. The high limit counters 61, 62, 63 and 64 are all similar. As shown, the high limit counter 62 comprises a stepping relay 101 adapted to energize an alarm or control means 103 from a source of energizing current, shown here as the battery 102. The high limit counter 62 has been arranged to perform an alarm or control function when ten of the voltages scanned have fallen within its particular suppression group. Thus, the alarm or control means 103 and the energizing source 102 have been connected in series between the tenth contact and the contact arm of the stepping switch 101. As shown, the stepping switch 101 is advanced one step each time the relay contacts 20c and relay contacts 34c are in the positions necessary to complete the energizing circuit through the battery 65.

High limit control is particularly adapted for use with the extreme limit suppression groups. If, for example, an abnormal number of variables fall within these groups early in the scanning cycle, it would give an indication that the particular lot of variables being tested was not acceptable wtihout the necessity of completing this scanning cycle. This would provide for a considerable saving of time if the number of variables being scanned was extremely large or if the scanning process was continuous. The control function which could be effected by this circuit could for example be automatic rejection of the lot being tested or an automatic adjustment of the manufacturing process to correct the defect detected.

Referring now to FIG. 3, there is shown a circuit diagram of the ratio control circuit. This circuit enables an alarm or control function to be instigated upon the occurrence of the predetermined ratio between the number of voltages falling within a particular channel to the total number of voltages scanned. The ratio control counter 72 comprises a stepping switch 110 connected so as to add resistance in the arm of a Wheatstone bridge circuit 111. Accordingly, the contacts of the stepping switch 110 are connected to taps on a resistor 112. The contact arm 113 of the stepping switch 110 is connected to a bridge input terminal 114 by means of a conductor 115. In addition to the resistance 112, the Wheatstone bridge circuit 111 includes a fixed resistance 116, an adjustable set point resistor 117, and a resistor 118 adapted to be connected in the bridge circuit in steps by means of the total event counter 81. The junction 119 of the resistors 116 and 117 constitutes the other input terminal of the bridge circuit 111. The input terminals 114 and 119 of the Wheatstone bridge circuit 111 are connected across the secondary winding 121 of a transformer 122 having its primary winding 123 connected across a suitable source of alternating current, the conductors $L_1$ and $L_2$.

The total event counter 81 comprises a stepping switch 126 having its contacts adapted to add steps of the resistor 118 into the bridge circuit 111. Accordingly, the contacts of the stepping switch 126 are connected to taps on the resistor 118. The contact arm 127 of the stepping switch 126 is connected to an output terminal 128 of the bridge circuit 111. A junction 129 of the resistors 112 and 116 constitutes the other output terminal of the Wheatstone bridge circuit 111. The output terminals 128 and 129 are connected to the primary winding 131 of a transformer 132 having its secondary winding 133 connected across the input terminals of an amplifier and phase discriminator 134. The amplifier and phase discriminator 134 is operative to control a suitable alarm or control means 135. The phase discriminator 134 may be of the type shown in FIG. 4 wherein the relay 34 is operative to control the alarm or control means 135.

In the operation of the ratio control circuit shown in FIG. 3, the ratio control counter 72 is operative to add resistance to the Wheatstone bridge 111 each time it is advanced by the simultaneous closing of the relay contacts 20d and 34d. Similarly, the total event counter 81 is operative to add resistance to the Wheatstone bridge circuit 111 each time a new voltage is scanned as indicated by the closing of the relay contacts 34e. When the ratio of the resistances stepped into the bridge circuit 111 by the operation of the ratio control counter 72 and the total event counter 81 reaches a predetermined value as determined by the adjustment of the set point resistor 117, the output of bridge circuit 111 will change phase causing the phase discriminator to actuate the alarm or control means 135. In this manner it is possible to initiate an alarm or control function if the distribution of the voltages scanned is skewed, flattened, or peaked in a manner indicating undesirable process operation. It should be noted that, if it is desired to control from the ratio of two suppression groups, the ratio control counters of the appropriate groups can be connected into the Wheatstone bridge circuit in the manner in which the ratio control counter 72 and the total event counter 81 are connected in the embodiment of the invention shown in FIG. 3.

Referring now to FIG. 4, there is shown a circuit diagram of the phase discriminator 33 of FIG. 1 adapted to energize the relay 34. As explained before, this circuit is a modification of the motor drive circuit shown in the Wills Patent 2,423,540. This phase detector circuit employs a twin triode vacuum tube with the triode sections 151 and 152 connected in parallel to provide a suitable relay current. The plates of the triodes 151 and 152 are connected through the parallel combination of the relay winding 34 and the capacitor 150 to an end terminal 153 of a transformer secondary winding 154. The transformer secondary winding 154 has a center tap 155 which is connected to ground. The cathodes of the triode sections 151 and 152 are connected through a common resistor 156 and a conductor 157 to a tap 158 on a resistor 159. The resistor 159 is connected across half of a secondary winding 161. As shown, one end terminal 162 of the transformer secondary winding 161 is connected to ground to complete the series circuit necessary for vacuum tube energization. The secondary windings 154 and 161 constitute part of a transformer 163 which has a primary winding 164 connected across a suitable source of alternating current, the conductors $L_1$ and $L_2$. The control grids of the triode sections 151 and 152 are connected in parallel to a pair of circuit input terminals 166 and 167.

The phase discriminator 33 is a half wave phase discriminator deriving a suitable cathode bias from the voltage drop across the resistor 159. The condenser 150 connected across the relay 34 is operative to prevent relay chatter due to the half cycle relay energization. In operation, the relay 34 is energized as long as the input signal to the input terminals 166 and 167 is of the proper polarity. To this end, the phasing of the voltage applied to the transformer secondaries 154 and 161 is made such as to accomplish this mode of operation. When the polarity of the input signal applied to the input terminals 166 and 167 changes, the relay 34 is deenergized and the system operates in the manner described hereinbefore.

It should be noted that a plurality of voltage sources have been shown for energizing the relays incorporated in the present invention. It should be understood, however, that this has been done for simplicity, and that in practice many of the relays may be operated from a common voltage source. In addition, for simplicity, the stepping switches have been illustrated as having single decks and a limited number of contacts. In practice, however, the stepping switches employed may have multiple decks, each having a large number of contacts arranged to be scanned in sequence.

While, in accordance with the provisions of the statutes, there have been illustrated and described the best forms of the embodiments of the present invention now known, it will be apparent to those skilled in the art that changes may be made in the forms of the apparatus disclosed without departing from the spirit of the invention as set forth in the appended claims, and that in some instances certain features of the invention may be used to advantage without a corresponding use of other features.

Having now described this invention, that which is claimed as new and which it is desired to secure by Letters Patent is:

1. In combination, an amplifier, a phase discriminator connected to the output of said amplifier, a relay connected to said phase discriminator, input means connected to the input of said amplifier and adapted to receive an input signal of such a polarity as to cause relay energization, a plurality of suppression groups interposed between said input means and said amplifier, the voltage difference between each of said suppression groups representing a voltage range into which an input signal may fall, an impulse counter for connecting said suppression groups in steps one after another to the input of said amplifier in opposition to an input signal, pulsing means for said impulse counter, said pulsing means being operatively connected to said relay and energized when said relay is energized, a counter for each suppression group, circuit means for energizing said counters when said relay is deenergized, means operated by said impulse counter for connecting said counters to said counter energizing circuit means in steps, one after another, with the appropriate suppression group, a high limit control counter circuit for each of said suppression groups, circuit means for energizing said high limit counters when said relay is deenergized, and means operated by said impulse counter for connecting said high limit counters to said energizing circuit means in steps, one after another, with the appropriate suppression group.

2. An apparatus for classifying an input signal according to its magnitude comprising an amplifier, a plurality of suppression sources, each of said sources representing a suppression group into which the input signal may fall, means for sequentially connecting said suppression sources, one after another, to the input of said amplifier in opposition to said input signal, signal responsive means connected to the output of said amplifier and operative when energized to cause said first named means to connect said suppression sources to said amplifier input, said signal responsive means being arranged to be energized when said input signal predominates in said input of said amplifier, and to become deenergized upon said input signal being effectively overcome by one of said opposing suppression sources, a counting means for each of said suppression groups, and means associated with said signal responsive means and operative when said signal responsive means are deenergized to cause the counter associated with the suppression group causing said deenergization to register.

3. Apparatus as specified in claim 2 including a high limit control counter for each of said suppression groups, and means associated with said signal responsive means and operative when said signal responsive means are deenergized to cause the high limit control counter associated with the suppression group causing said deenergization to advance one count, said control counter being operative to perform a control function when said control counter has been advanced a predetermined number of counts.

4. Apparatus as specified in claim 2 including a ratio control counter for each of said suppression groups, and means associated with said signal responsive means and operative when said signal responsive means are deenergized to cause the ratio control counter associated with the suppression group causing said deenergization to advance one count, said ratio control counters being interconnected to perform a control function when the ratio of the number of input signals falling in one suppression group to the number of input signals falling in another suppression group reaches a predetermined value.

5. An apparatus for classifying a plurality of input signals according to their magnitudes comprising in combination an amplifier, scanning means for successively connecting a plurality of input signals to said amplifier, signal responsive means connected to the output of said amplifier, a plurality of signal suppression groups, means connected to said signal responsive means for sequentially connecting said suppression groups to said amplifier in steps, one after another and in opposition to said input signals, until one of said suppression groups effectively predominates over the one of said input signals then connected to said amplifier and causes the deenergization of said signal responsive means, a plurality of counting means, one of said counting means being associated with each of said suppression groups, means connected to said signal responsive means and operative upon the deenergization of said signal responsive means for causing the counter associated with the suppression group causing the deenergization of said signal responsive means to register a count, and means operative upon the deenergization of said signal responsive means to cause said scanning means to connect a new input signal to said amplifier.

6. In combination, an amplifier, phase sensitive relay means connected to the output of said amplifier, input signal means connected to the input of said amplifier and adapted to receive sequentially input signals such as to cause relay means energization, a plurality of variable suppression groups connected to said amplifier in steps, one after the other, in opposition to said input signal, by the energization of said relay means, each of said suppression groups having a counter for visual indication of the number of input signals falling within said group, a high limit counter adapted to perform a control function when a predetermined number of input signals fall within said group, and a ratio control counter adapted to perform a control function when the ratio of the number of input signals falling in said group to the number of input signals falling in any one of the other groups reaches a predetermined value, and circuit means including said ratio control counter of said group and a ratio control counter of said one of said other groups, said circuit means also including first means for providing a first effect which changes proportionally as said number of input signals falling in the first mentioned group increases, second means for providing a second effect which changes proportionally as said number of input signals falling in said one of said other groups increases, and third means responsive to the ratio of said first and second effects for performing said control function when the last mentioned ratio reaches a predetermined value, said counters, high limit counters, and ratio control counters being made ready for energization when the appropriate suppression group is connected to the input of said amplifier and energized when said relay means are deenergized.

7. In a system for classifying a plurality of voltages according to their magnitudes, scanning means for scanning the plurality of voltages to be classified, a plurality of adjustable suppression voltage sources, the difference between said suppression voltage sources representing a classification group into which an input voltage may fall, each of said suppression sources having associated therewith high limit control counting means operative to perform a control function if the number of input voltages found to fall within the classification group defined by the value of said suppression source reaches a predetermined value, ratio control counting means operative to perform a control function when the ratio of the number of input voltages found to fall within said group to the number of voltages found to fall within any of the other of said groups reaches a predetermined value, and visual counting means for giving an indication of the number of input voltages found to fall within said group, circuit means including said ratio control counting means of said group and a ratio control counting means of said any of said other groups, said circuit means also including first means for providing a first effect which changes proportionally as said number of input voltages found to fall within the first mentioned group increases, second means for providing a second effect which changes proportionally as said number of voltages found to fall within said any of said other groups increases, and third means responsive to the ratio of said first and second effects for performing the last mentioned control function when the last mentioned ratio reaches a predetermined value, means for comparing said input voltages sequentially with each of said suppression sources, means operatively connected to said comparing means for advancing one count of the counting means associated with the suppression source defining the suppression group into which an input voltage is found to fall, and means operatively connected to said comparing means for advancing said scanning means upon the classification of a voltage.

8. In a system for classifying a plurality of voltages according to their magnitudes, a plurality of voltage groups into which a voltage may fall, each of said groups having associated therewith counting means, high limit control means, and ratio control means, means for comparing a voltage to be classified sequentially with each of said groups, the counting means, high limit control means, and ratio control means associated with a particular voltage group being made ready for energization as an input voltage is compared to that voltage group, a total event counter for counting the number of voltages classified, means controlled by said comparing means for energizing the counting means, high limit control means, and ratio control means of the particular group into which an input voltage is found to fall, means for energizing the total event counter when an input voltage is found to fall within a particular group, control means energized when the ratio of the total number of input voltages falling within any one particular group to the total number of voltages scanned reaches a predetermined value and circuit means including said ratio control means of said one particular group and said total event counter, said circuit means also including first means for providing a first effect which changes proportionally as said total number of input voltages falling within said one particular group increases, second means for producing a second effect which changes proportionally as said total number of voltages scanned increases, and third means responsive to the ratio of said first and second effects for effecting said energization of said control means when the last mentioned ratio reaches a predetermined value.

References Cited in the file of this patent

UNITED STATES PATENTS

| | | |
|---|---|---|
| 2,182,875 | Levy | Dec. 12, 1939 |
| 2,486,390 | Cunningham | Nov. 1, 1949 |
| 2,500,294 | Phelps | Mar. 14, 1950 |
| 2,529,666 | Sands | Nov. 14, 1950 |
| 2,560,829 | Stewart | July 17, 1951 |
| 2,685,681 | Tidball | Aug. 3, 1954 |
| 2,688,441 | Merrill | Sept. 7, 1954 |
| 2,709,771 | Dehn | May 31, 1955 |
| 2,721,701 | Hardesty et al. | Oct. 25, 1955 |
| 2,775,754 | Sink | Dec. 25, 1956 |
| 2,806,651 | Fernsler | Sept. 17, 1957 |
| 2,893,635 | Gitzendanner | July 7, 1959 |

OTHER REFERENCES

Cooke-Yarborough: "A Pulse-Amplitude Analyzer of Improved Design," Proceedings IRE, Part III, March 1950, pp. 108–121.

Wheeler: "Measurement of the Size-Distribution of Spray Particles," Electronic Engineering, October 1953, pp. 402–406.